(12) United States Patent
Avery

(10) Patent No.: X4029
(45) Date of Patent: Feb. 15, 1825

(54) PLOUGH

(76) Inventor: George D. Avery

George D. Avery
Letters Patent

The Schedule referred to in these Letters Patent and making part of the same containing a description in the words of the said George D. Avery himself of his improvement in the Plough.

---

The hind part of the lower edge of the land side of the plough, to be furnished with a heel piece, or shoeing, in either of the following manners:_ 1st The heel-pieces for a two horse plough to be about 8 inches long and 1½ inch square, with two holes crossing each other at a right angle through the middle. The heel piece is let into the lower edge of the land side, in its proper place; and is fastened with a screw bolt, which passes through the land side, or there may be 4 holes through the heel piece 2 crossing each other at a right angle, near, and at equal distances from each end and fastened with 2 screw bolts passing through the land side. One object in puting on the heel piece, in this manner and form and placing the holes and screw bolts as before described, is that it may work with either end foremost and with either side to the land, which will admit of 7 simple changes of its position, so as to have 8 different parts of it in succession to supply the wearing place at the heel. This heel piece may be adjusted at pleasure by puting leather (or something else) on its side next to the furrow, to set it to the land, or on its upper side to set it down, which will cause it, not only to work more uniformly, and to last much longer, but will regulate the pitch, and the taking of land and breadth of furrow of the plough. The holes through the land side may be round or long up and down like short mortises to admit the heel piece to be adjusted or set down. 2nd. The heel piece to be made in the form of a parallelogram, or long square, about 8 inches long, 2 inches wide, and one inch thick, with a hole through the middle of its sides. this heel piece is let into the lower edge of the land side, in its proper place, and is fastened with a screw bolt which passes through the land side, or there may be two holes through this heel piece, near and at equal distances from each end, and fastened with two screw bolts, passing through the land side. One object in puting on this heel piece in this manner and form, and placing the holes, and screw bolts as before described described, is that it may work with either end foremost, and with either side to the land, which will admit of three simple changes of its position, so as to have four different parts of it in succession, to supply the wearing place at the heel, and this heel piece may also be adjusted in the manner before described. 3^d The heel piece to be made in the form of two parrellelograms, each to be about 8 inches long, 2 inches wide and 5/8 inch thick connected at their edges and forming two sides of a hollow square, an end view of which is thus  with a hole through the middle of each side, this heel piece is let into the lower edge of the land side, in its proper place, and is fastened with a screw bolt, which passes through the land side, or there may be two holes through each side and at equal distances from each end and fastened with their screw bolts, or the outer edges may be thinner, an end view of which is thus . One object in puting this heel piece on in this manner and form and placing the holes and screw bolts as before described, is, that it may work with either end foremost, and with either side to the land, which will admit of one simple change of its position, so as to have two different parts of it in succession to supply the wearing place at the heel and this heel piece may also be adjusted in the manner before described. 4^th The heel piece to be made round, in the form of a cylinder, about 8 inches long, and 1½ inch diameter. this heel piece is let into the lower edge of the land side in its proper place, and secured as mentioned below. And this heel piece may also be adjusted in the manner before described. These heel pieces may be made of cast iron, wrought iron, steel or any kind of metal or wood, and may be lined with steel or iron, they may be made solid, or hollow, or hollow only at one or both ends. the corners may be left on, or taken off, the sides may be a little bevelling for the greater convenience of casting in metal moulds, or in sand they may be longer or shorter, and may be fastened on with screw bolts, with their ends made to fit into the hollows, or the land side may be made with a little protuberance or point, to fit into the hollow of one end of the heel piece, and the other end be fastened with a screw bolt made to fit it, and placed so as to draw the heel piece tight, or both ends of the heel pieces may protrude out at their centres, or a pin or knob may be put into one, or both ends, to which one end of a screw bolt may be fitted, to fasten it, the screw bolts may go through the land side, at a right angle with its surface, or they may go through slanting to throw draw the heel piece tight at its ends, and there should be projections on the in-
side of the land side with their surfaces so shaped that the nuts of the screw
bolts will rest on them evenly. Each and all the several modes of improv-
ing the plough, by heel pieces or shoeings, as herein before specified I claim as my
invention & improvement.

Exd.

George D. Avery [illegible]

Witness
William Elliot
S. M. Elliot

DRAFTSMAN'S DIVISION.

*All communications should be addressed to*
"The Commissioner of Patents,
Washington, D. C."

**2—328 *a*.**

*DEPARTMENT OF THE INTERIOR,*

United States Patent Office,

*Washington, D. C.,* ..........................., *189*...

*SIR:*

*The printed* copies ...................... *of Patent No.* Geo Avery
.................are............ *exhausted.* Feb 15, 1825

*As soon as printed a copy will be mailed you to complete your order.*

..........................................................................................

..........................................................................................

*By direction of the Commissioner:*

*Very respectfully,*

.................................................

*Chief Clerk.*

.................................................

.................................................

.................................................

8143b6-97-5m